(12) United States Patent
Gain

(10) Patent No.: US 8,152,117 B2
(45) Date of Patent: Apr. 10, 2012

(54) ADJUSTABLE BUSHING

(75) Inventor: Paul R. Gain, Bonsall, CA (US)

(73) Assignee: Paul R. Gain, Bonsall, CA (US)

( * ) Notice: Subject to any disclaimer, the term of this patent is extended or adjusted under 35 U.S.C. 154(b) by 499 days.

(21) Appl. No.: 12/346,659

(22) Filed: Dec. 30, 2008

(65) Prior Publication Data
US 2010/0162519 A1 Jul. 1, 2010

(51) Int. Cl.
*F16M 11/14* (2006.01)
(52) U.S. Cl. .................................................. 248/188.4
(58) Field of Classification Search ............... 248/188.4, 248/188.2, 188.9, 544; 16/2.1
See application file for complete search history.

(56) References Cited

U.S. PATENT DOCUMENTS

| | | | | |
|---|---|---|---|---|
| 5,653,417 A | * | 8/1997 | DeBarber et al. ............ | 248/688 |
| 6,328,513 B1 | * | 12/2001 | Niwa et al. ................... | 411/339 |
| 7,374,131 B2 | * | 5/2008 | Tiid et al. .................... | 244/118.5 |
| 7,588,218 B2 | * | 9/2009 | Kim ............................ | 248/188.4 |
| 7,874,059 B2 | * | 1/2011 | Morrison et al. .......... | 29/525.02 |
| 2002/0158173 A1 | * | 10/2002 | Fisher ......................... | 248/188.4 |
| 2006/0006295 A1 | * | 1/2006 | Gainer ........................ | 248/188.4 |
| 2010/0171012 A1 | * | 7/2010 | Tseng ......................... | 248/188.2 |
| 2011/0058317 A1 | * | 3/2011 | Oota .......................... | 361/679.01 |

* cited by examiner

*Primary Examiner* — Ramon Ramirez
(74) *Attorney, Agent, or Firm* — Leason Ellis LLP

(57) ABSTRACT

An adjustable bushing according to one embodiment includes a first part having a threaded section that extends outwardly from a base section such that an upper surface of the base section defines a ledge that surrounds the threaded section. The adjustable bushing also includes a second part having a threaded opening that is open along a bottom surface of the second part. The threaded opening has threads that are complementary to threads of the threaded section of the first part to permit the first and second parts to be securely coupled to one another and permit a height of the bushing to be adjusted between a fully retracted position where a height of the bushing is at a minimum and a fully extended position where the height of the bushing is at a maximum.

19 Claims, 3 Drawing Sheets

ADJUSTABLE BUSHING

TECHNICAL FIELD

The present invention relates to a bushing/shim and more particularly, to a bushing that has an adjustable height for facilitating the alignment of mechanical components of manufactured objects or for providing leveling of an object and has application to a number of different fields, including but not limited to the automotive repair and restoration industry and in the field adjustment of heavy consumer products, such as refrigerators and washers.

BACKGROUND

In a number of different fields, it is important to compensate for variations in mechanical components of a manufactured object, which when assembled, results in some unacceptable variation in a particular physical relationship of those components. It is therefore desirable to provide a system and method that facilitates the alignment of mechanical components of manufactured objects. One member that is used to align mechanical components is a bushing.

A bushing can be used to transfer loads from a fastener to a much larger area in the underlying structure, with the object being to reduce the strain on individual fibers within the underlying structure. One industry in which bushings are commonly used is the automotive industry, including automotive repair and restoration. In a car or other vehicle's suspension, rubber bushings are used to connect the various moving arms and pivot points to the chassis and other parts of the suspension. In order to minimize vibration, wear, and transmission of noise, they often incorporate flexible material such as rubber or polyurethane. These bushings often take the form of an annular cylinder of flexible material inside a metallic casing or outer tube.

In just about every manufactured automobile, bushings or shims are incorporated into the design to connect the frame, subframe, or frame rails to the cars main body. These bushings or shims are used to connect various structural and non-structural components to the frame, subframe, or frame rails to the car's body panels and components. One structural component that is used in an automobile is a core support. The core support not only holds the radiator but it is also the support structure for the front of the car. The core support is the part that holds the fenders square and keeps everything bolted to the frame. The core support is secured to the frame. In restoring an automobile, once the core support is in place and all components have been installed, the radiator can be dropped into place. Typically, the radiator is retained by rubber-cushioned cradles in the bottom of the core support or is directly bolted to the core support.

As a vehicle ages, bushings have a tendency to wear out due to environmental conditions, vehicle weight distribution, or simply can become old and cracked. When a vehicle is being repaired due to damage, or being restored by automotive enthusiasts, the bushings are typically replaced with new bushings or shims. There are a number of different types of replacement bushings that are available. These existing replacement bushings are typically manufactured out of either rubber or neoprene. Alternatively, some are manufactured from billet aluminum. Often, additional body shims are typically required to achieve the desired overall fit. Shims may not always be used and doing so typically results in less than desired fit between the body panels and other mating components.

SUMMARY

An adjustable bushing according to one embodiment includes a first part having a threaded section that extends outwardly from a base section such that an upper surface of the base section defines a platform that surrounds the threaded section. The adjustable bushing also includes a second part having a threaded opening that is open along a bottom surface of the second part. The threaded opening has threads that are complementary to threads of the threaded section of the first part to permit the first and second parts to be securely coupled to one another and permit a height of the bushing to be adjusted between a fully retracted position in which a height of the bushing is at a minimum and a fully extended position in which the height of the bushing is at a maximum.

A method for obtaining a proper fit between a first vehicle component and a second vehicle component that is coupled to the first vehicle component includes the steps of: inserting an adjustable bushing between a surface of the first vehicle component and a surface of the second vehicle component. The bushing includes a first part having a threaded section that extends outwardly from a base section such that an upper surface of the base section defines a ledge that surrounds the threaded section; and a second part having a threaded opening that is open along a bottom surface of the second part. The threaded opening has first threads that are complementary to second threads of the first part to permit the first and second parts to be securely coupled to one another and permit a height of the bushing. The method includes adjusting a height of the bushing by rotating one of the first and second parts relative to the other part to achieve improved alignment between the first and second vehicle components.

Other features and advantages of the present invention will be apparent from the following detailed description when read in conjunction with the accompanying drawings.

BRIEF DESCRIPTION OF THE DRAWINGS FIGURES

The foregoing and other features of the present invention will be more readily apparent from the following detailed description and drawings figures of illustrative embodiments of the invention in which.

DETAILED DESCRIPTION OF EMBODIMENTS

Figure 1:
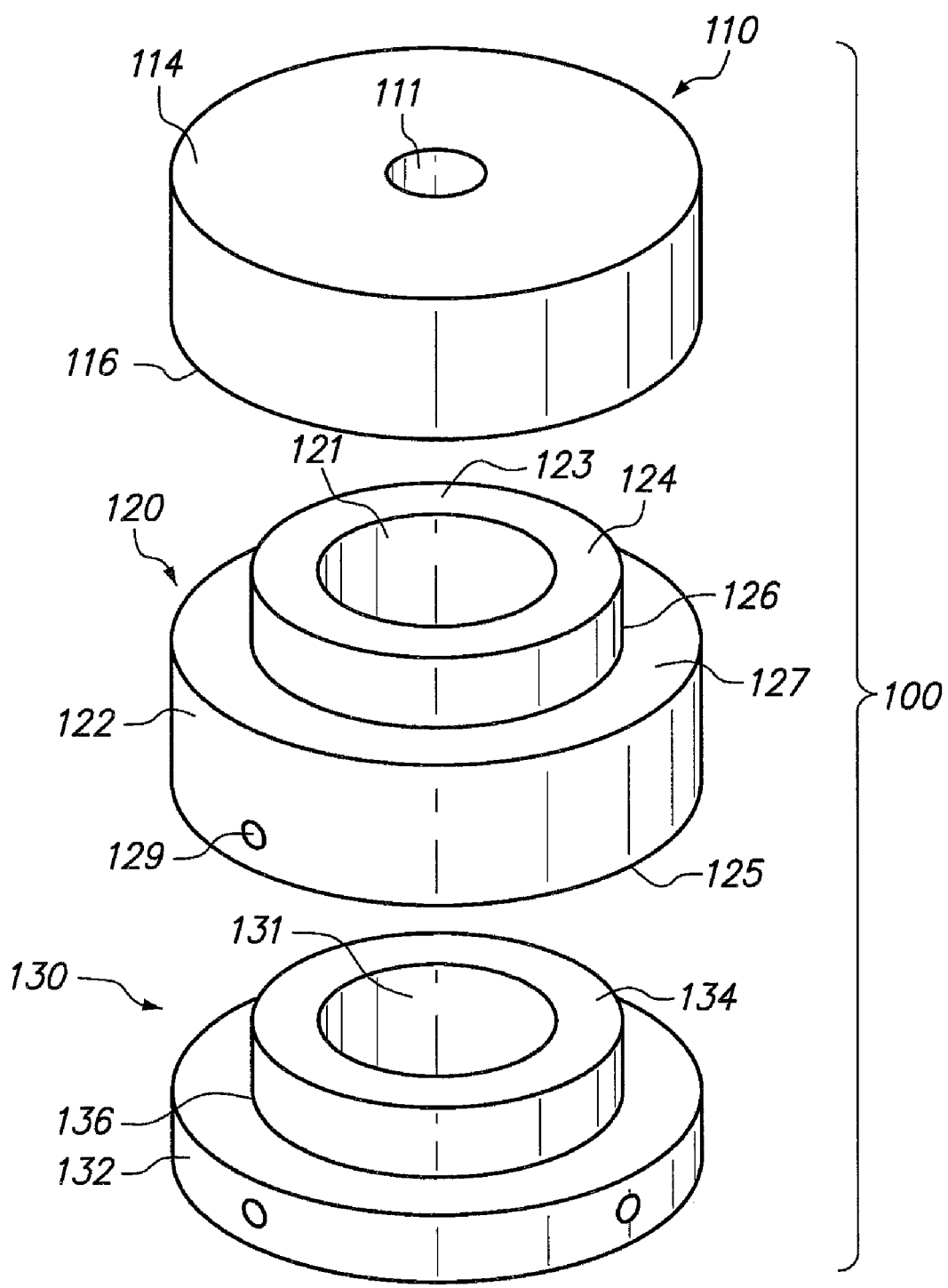
FIG. 1 is a perspective view of an adjustable bushing according to a first embodiment of the present invention.

FIG. 1 is a perspective view of one exemplary adjustable bushing 100. It will be appreciated that the adjustable bushing 100 is formed of at least two parts and can be formed of three complementary parts as shown. Thus, while the embodiment described herein and shown in FIG. 1 is formed of three parts, it will be understood that one part (e.g., the top part) can be eliminated and not used.

The bushing 100 includes a first part 110, a second part 120, and a third part 130. The first part 110 represents a top part, the second part 120 represents the middle part and the third part 130 represents the bottom part. The first part 110 has a disk shape and includes a center bore 111 formed therethrough. The first part 110 has a first face (upper surface) 114 and a second face (lower surface) 116. The first face 114 and the second face 116 can be smooth planar surfaces. Preferably, the faces 114, 116 are parallel to one another.

The center bore 111 can have a non-uniform dimension (e.g., diameter) and in particular, the center bore 111 can have a minimum diameter at the first face 114 and a maximum diameter at the second face 116. For example, the center bore 111 can have two different regions that have two different diameters, with the smaller diameter region formed an entrance into the larger diameter region.

The second part 120 is also disk shaped and is defined by a first annular section 122 and a second annular section 124 that extends from the first annular section 122. The second annular section 124 has dimensions that are less than the dimensions of the first annular section 122 and therefore, a shoulder 126 is formed and defined between the first and second annular sections 122, 124. The shoulder 126 can be in the form of a right angle shoulder. A center bore 121 is formed through the second part 120 (through the first and second sections 122, 124). Based on the foregoing construction, a platform (ledge) 127 is formed and this platform 127 seats against a surface to which the bushing 100 is coupled to and disposed between. The platform 127 is annular shaped.

In one embodiment, the platform 127 is a smooth surface; however, in other embodiments, the platform 127 can have surface modifying characteristics, such as ribs or spaced protrusions or a wave pattern or a spoke pattern, that extend generally normally away from the surface 127 and contact the object to which the bushing 100 is coupled. The surface modifying characteristics alter the force applied to the object as the bushing is adjusted.

The second part 120 also includes a center bore 121 that extends therethrough from a first end to a second end thereof. In the embodiment shown in FIG. 1, the center bore 121 is typically uniform throughout its length (unlike the first part 110) in that it is defined by a single diameter. In accordance with the present invention, the center bore 121 includes first threads (not shown) formed therein and in particular, the first threads are formed along an inner surface of the second part 120 that defines the center bore 121. The threads do not have to be formed along the entire length of the center bore 121 but instead they can be formed only along a portion of the center bore 121 and in this case, they are formed along a bottom portion of the center bore 121 (e.g., along the first section 122). In the embodiment of FIG. 1, the first threads are visible from the underside of the second part 120.

Figure 2:
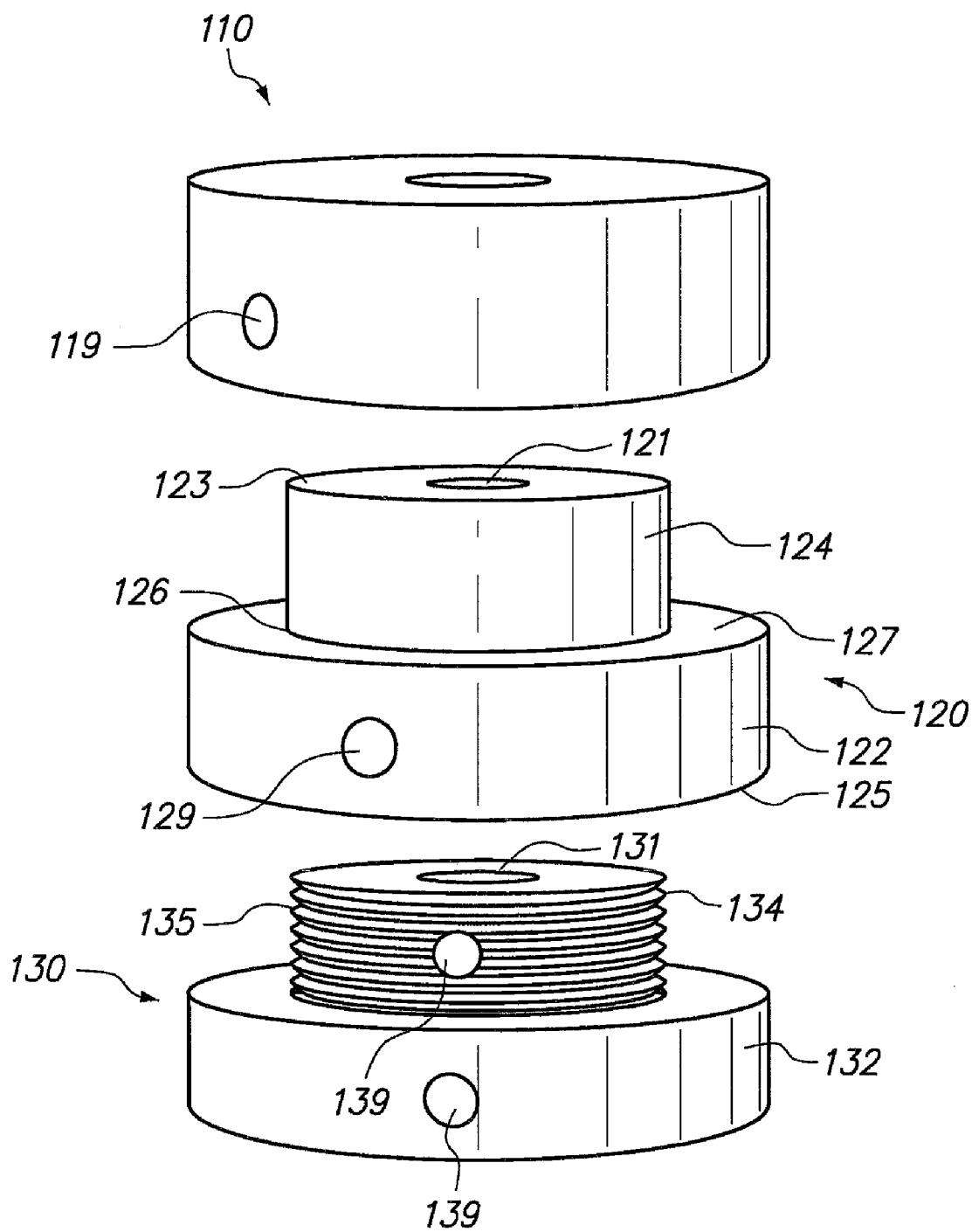
FIG. 2 is another perspective view of an adjustable bushing.

However, in another embodiment, shown in FIG. 2, the construction of the second part 120 is similar to the first part 110 in that the center bore 121 has a non-uniform diameter. For example, the center bore 121 can have a minimum diameter at a first face 123 and a maximum diameter at a second face 125. For example, the center bore 121 can have two different regions that have two different diameters, with the smaller diameter region formed an entrance into the larger diameter region.

The second part 120 can also include one or more side openings 129. The side openings 129 are formed within the first annular section 122 and are circumferentially spaced about an outer surface of the first annular section 122. The side openings 129 extend through the first section 122 and can be in communication with the center bore 121. In other words, the side openings 129 can either terminate prior to the center bore 121 or they can form an entrance into the center bore 121. The side openings 129 are typically formed perpendicular to the center bore 121.

The first part 110 can contain side openings 119 that are similar to the side openings 129.

The outer surfaces of the first and second annular sections 122, 124 can be a smooth surface.

The third part 130 is complementary to the second part 120 as described below in that the second and third parts 120, 130 intimately mate with one another such that the height of the combined parts 120, 130 can be adjusted.

As with the second part 120, the third part 130 is also disk shaped and is defined by a first annular section 132 and a second annular section 134 that extends from the first annular section 132. The second annular section 134 has dimensions that are less than the dimensions of the first annular section 132 and therefore, a shoulder 136 is formed and defined between the first and second annular sections 132, 134. The shoulder 136 can be in the form of a right angle shoulder. A center bore 131 is formed through the third part 130 (through the first and second sections 132, 134).

The third part 130 also includes a center bore 131 that extends therethrough from a first end to a second end thereof. In the embodiment shown in FIG. 1, the center bore 131 is typically uniform throughout its length (unlike the first part 110) in that it is defined by a single diameter.

The third part 130 includes second threads 135 that are constructed to intimately mate with the first threads in that the first and second threads threadingly engage one another, thereby coupling the second part 120 to the third part 130. The second threads 135 are formed along an outer surface of the second annular section 134.

The second annular section 134 is designed to be received into the bore 121 of the second part 120 at least along the underside of the second part 120 to allow the two parts 120, 130 to be mated together and securely attached to one another. When the bore 121 of the second part 120 has a non-uniform construction (diameter), the bottom most portion of the bore 121 has height that permits the second annular section 134 to be completely received therein when the second and third parts 120, 130 are mated to one another and are in a completely retracted position.

The second threads 135 can be male threads and the first threads can be female threads or vice versa, thereby allowing the second and third parts 120, 130 to be threaded by fastened to one another.

The third part 130 can also include one or more side openings 139. The side openings 139 can be formed within the first annular section 132 and are circumferentially spaced about an outer surface of the first annular section 132. The side openings 139 extend through the first section 132 and can be in communication with the center bore 131. In other words, the side openings 139 can either terminate prior to the center bore 131 or they can form an entrance into the center bore 131. The side openings 139 are typically formed perpendicular to the center bore 131. In addition, the side openings 139 can also be formed circumferentially about the outer surface of the second section 134 as shown in FIG. 2. When formed in both the first and second sections 132, 134, the side openings 139 can be aligned with one another (e.g., one formed on top of the other).

At least one portion of the center bores of all three parts 110, 120, 130 are axially aligned to allow a fastener (not shown), such as a bolt, to be received therethrough for attaching the bushing 100 to and between two surfaces. For example, a bolt with a head can be passed through the parts 110, 120, 130 and a nut mates with the bolt to position the bushing 100 in a specific location within its intended application. However, there may be applications where the parts 110, 120, 130 do not include a center bore.

As previously mentioned, the bushing 100 is adjustable in that the second and third parts 120, 130 are attached to one another (mated to one another by the first and second threads) at a minimal or maximum depth to obtain the desired overall height of the bushing 100, thereby allowing for variations in the installed height of the bushing/shim 100. In this manner, the bushing 100 is adjustable.

The bushing 100 can thus be adjusted so that its overall height can be selected between a fully retracted position in which the second and third parts 120, 130 have a minimum overall height and a fully extended position in which the second and third parts 120, 130 have a maximum overall height.

The side openings 129, 139 can serve more than one purpose. For example, the side openings 129, 139 can receive a set screw to provide an additional means for attaching the bushing 100 to an object. Alternatively, the side openings 129, 139 can receive an object, such as an alien wrench that permits a torque to be applied to the bushing 100 to cause adjustment of one part relative to the other (thereby either increasing or decreasing the height of the bushing 100).

It will also be appreciated that there are possible applications where more than three parts may be used.

The bushing 100 can be manufactured from billet aluminum, cast aluminum or a hard, durable plastic material.

Figure 3:
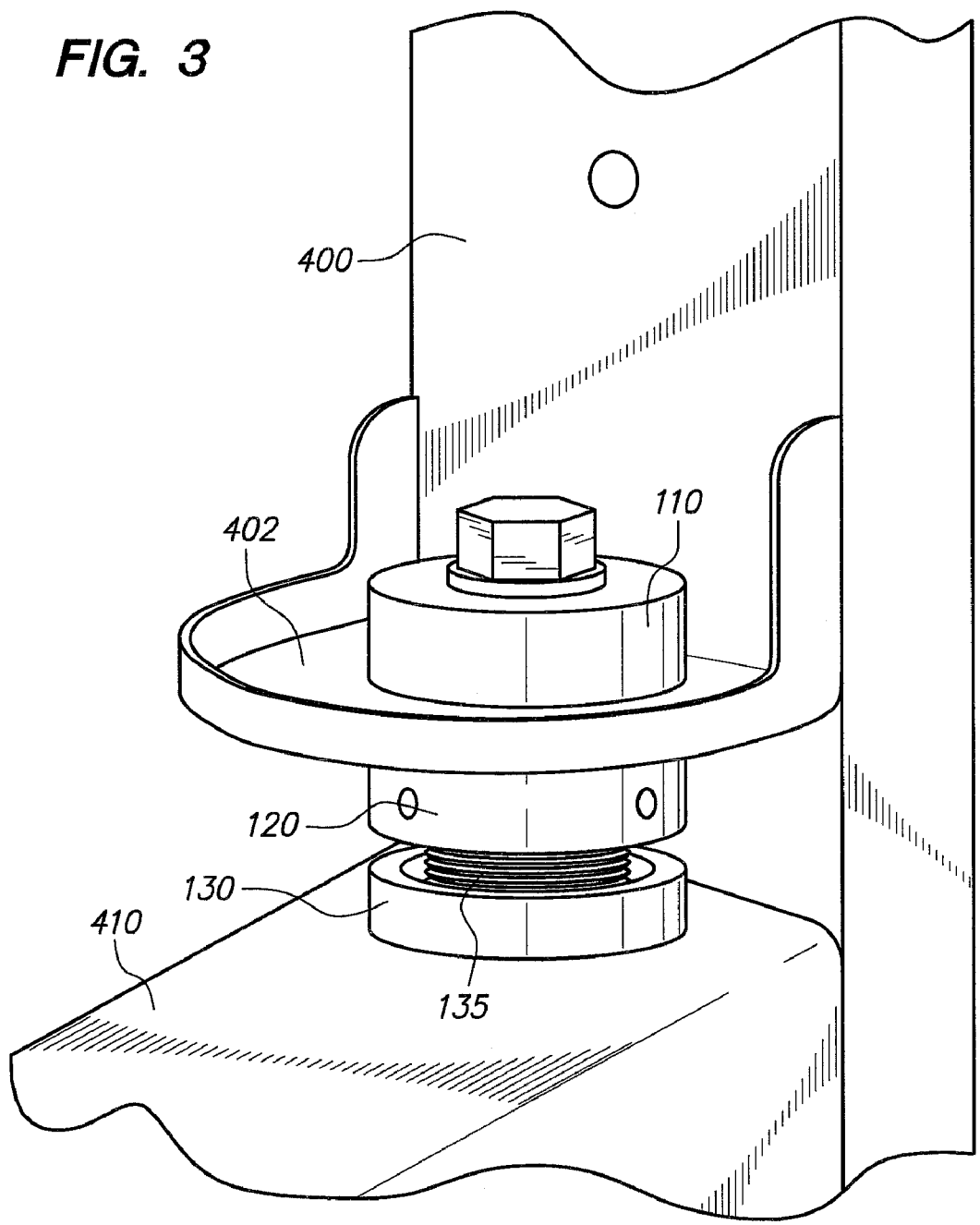
FIG. 3 is a perspective view of the adjustable bushing used in an exemplary application in this case, automotive repair and restoration industry, where a core support is mounted to a vehicle frame member.

As shown in FIG. 3, one application for bushing 100 is an automotive repair and restoration application. In particular, the bushing 100 can be used for connecting the frame, subframe or frame rails to the main body of the car. FIG. 3 shows and application where a core support 400 of the vehicle is attached to the frame 410. The core support 400 includes a flange member 402 that has an opening (not shown) formed therethrough. The opening is sized to receive the fastener (bolt) that is received through the center bores of the parts of the bushing 100.

In the application shown in FIG. 3, the first part 110 is disposed on one side (e.g., top surface) of the flange member 402, while the second and third parts 120, 130 are disposed in a space between the underside of the flange member 402 and a top surface of the frame 410. The bolt is inserted through the center bore of the first part 110 and through the opening and then through the center bores of the second and third parts 120, 130 and a nut can be threadingly attached to the bolt along an underside of the frame 410. The second and third parts 120, 130 are threadingly mated to one another and the second part 120 can be adjusted by rotating the second part 120 relative to the third part 130. Alternatively, the third part 130 can be rotated relative to the second part 120. Both of these maneuvers cause the height of the second and third parts 120, 130 to increase or decrease to a target height that compensates for variations in the core support 400 and the frame 410.

The bushing 100 thus can also be used to connect various structural and non-structural components to the frame, subframe, or frame rails to the body panels of the car and other components thereof. However, the bushing 100 has a broader, more universal applicability to many other industries and applications where shims or bushings are used to mate two or more components together.

The bushing 100 can be used as a shim (foot) that can be used to steady or level an object. For example, large consumer products, such as a refrigerator or washer or dryer, typically includes four feet, one in each corner that are used to steady the object. Bookcases have similar structures. As is known, sometimes when installing a book case, the ground surface may not be completely level or there are other complications in leveling the bookcase. Adjustable feet in the form of screw pegs are adjusted to increase or decrease the height of one corner. However, this is not an easy task since the bookcase must be tipped over to allow access to the foot and then it is essentially a trial and error process where adjustments are made and then the bookcase is leveled again. This is a time consuming, difficult task.

The bushing 100 can thus be installed on corners of the object. Unlike prior art screw pegs, the bushing 100 permits adjustment of the respective corner without having to tip or otherwise move the object to allow access to the underside of the object. The user simply applies a tool, such as an allen wrench, to a side hole of at least one part of the bushing 100 and it is torqued to cause either an increase or decrease in the height of the bushing 100. This will result in leveling of the object without moving the object. In this embodiment, the bushing 100 can be formed of two components, with the first part 110 being eliminated.

In the case of heavy appliances or when the object is not to be moved, the second part 120 is the part that is adjusted by rotating the second part 120 relative to the third part 130.

It will also be appreciated that in one embodiment, the second part 120 can have an integral post that attaches to the object and the third part 130 is coupled to the second part 120 to allow adjustment therebetween, thereby changing the height of the bushing 100. The fastener (e.g., bolt and nut) described above for attaching the bushing to the core support is eliminated in this embodiment. In this case, the third part 130 is adjusted.

In yet another embodiment that particularly applies to heavy or cumbersome objects, a threaded fastener that is part of the object mates with a portion of the threaded center bore in the second part 120. As a result when the second part 120 is rotated, there is relative movement between not only the second and third parts 120, 130 but also between the second part 120 and the object.

Aspect ratio of threads can be different so that the relative movement between the second part 120 and the object from which the fastener extends is at a different speed than the movement between the second part 120 and the third part 130, thereby causing the desired positioning between the object and another surface, such as the ground surface.

It will be understood that the above description applications are merely exemplary and the bushing of the present invention can be used in an unlimited number of applications and configurations beyond those described above.

The bushing 100 is intended to be handled in one's hand in that one hand can hold one part of the bushing and the other part is adjusted (rotated) with the other hand. In one embodiment, the bushing 100 has a diameter of about 2 inches and a length (height) of about 2.5 inches. However, the bushing can come in any number of other dimensions; however, in most intended applications, the bushing can be handled and grasped by a person.

While exemplary drawings and specific embodiments of the present invention have been described and illustrated, it is to be understood that the scope of the present invention is not to be limited to the particular embodiments discussed. Thus, the embodiments shall be regarded as illustrative rather than restrictive, and it should be understood that variations may be made in those embodiments by workers skilled in the art without departing from the scope of the present invention as set forth in the claims that follow, and equivalents thereof. In addition, the features of the different claims set forth below may be combined in various ways in further accordance with the present invention.

What is claimed is:

1. An adjustable bushing comprising:
   a first part having a first threaded section; and
   a second part having a second threaded section, the second threaded section mating with the first threaded section to couple the first and second parts together and permit an overall height of the bushing to be adjusted by rotating one of the first and second parts relative to the other of the first and second parts;
   wherein the first part has a base section and a protrusion extending generally perpendicularly from the base section, the first threaded section being formed on an outer surface of the protrusion, wherein the first part has a center bore formed through both the protrusion and the base section.

2. The adjustable bushing of claim 1, wherein the first and second parts are disk-shaped bodies.

3. The adjustable bushing of claim 1, wherein the first part includes at least one side opening that is formed generally perpendicular to the center bore and is open along an outer surface of the base section.

4. The adjustable bushing of claim 1, wherein both the base section and the protrusion are annularly shaped.

5. The adjustable bushing of claim 1, wherein the second part has a base section and a protrusion extending from the base section, the second threaded section being formed along at least a portion of a center bore that is formed through the base section and protrusion of the second part, the second threaded section being exposed along an underside of the first part.

6. The adjustable bushing of claim 5, wherein the second part includes a side opening that is formed generally perpendicular to the center bore and is open along an outer surface of the base section.

7. The adjustable bushing of claim 1, wherein the first and second parts are formed of a material selected from the group consisting of billet aluminum, cast aluminum and a rigid plastic.

8. The adjustable bushing of claim 1, wherein the second part has an upper surface for seating against an object, the upper surface being shaped to have friction enhancing or force altering characteristics.

9. The adjustable bushing of claim 1, further including a third part that is configured to mate with the second part, wherein each of the first, second and third parts has a center bore that passes completely through the respective part from a top end to an opposing bottom end, wherein when the third part is mated with the second part, the center bore of the third part is axially aligned with the center bores of the first and second parts.

10. An adjustable bushing comprising:
    a first part having a threaded section that extends outwardly from a base section such that an upper surface of the base section defines a ledge that surrounds the threaded section; and
    a second part having a threaded opening that is open along a bottom surface of the second part, the threaded opening having threads that are complementary to threads of the threaded section of the first part to permit the first and second parts to be securely coupled to one another and permit a height of the bushing to be adjusted between a fully retracted position in which a height of the bushing is at a minimum and a fully extended position in which the height of the bushing is at a maximum.

11. The adjustable bushing of claim 10, wherein in the fully retracted position, the bottom surface of the second part seats against the ledge and the threaded section of the first part is fully received within the threaded opening of the second part.

12. The adjustable bushing of claim 10, wherein in the fully extended position, the threaded section of the first part is only partially received in the threaded opening of the second part and is visible therebetween.

13. The adjustable bushing of claim 10, further including a third part that is configured to mate with the second part, wherein each of the first, second and third parts has a center bore that passes completely through the respective part from a top end to an opposing bottom end, wherein when the third part is mated with the second part, the center bore of the third part is axially aligned with the center bores of the first and second parts.

14. A method for obtaining a proper fit between a first vehicle component and a second vehicle component that is coupled to the first vehicle component, comprising the steps of:
    inserting an adjustable bushing between a surface of the first vehicle component and a surface of the second vehicle component, the bushing including:
        a first part having a threaded section that extends outwardly from a base section such that an upper surface of the base section defines a ledge that surrounds the threaded section; and
        a second part having a threaded opening that is open along a bottom surface of the second part, the threaded opening having first threads that are complementary to second threads of the first part to permit the first and second parts to be securely coupled to one another and permit a height of the bushing; and
    adjusting a height of the bushing by rotating one of the first and second parts relative to the other part to achieve improved alignment between the first and second vehicle components.

15. The method of claim 14, wherein the first vehicle component comprises a core support and the second vehicle component comprises a vehicle frame.

16. The method of claim 14, further including the step of:
    providing a third part on an opposite side of the first vehicle component relative to the second part, the third part having a center bore that passes completely through the third part from a top end to an opposing bottom end, the first and second parts having respective center bores passing therethrough; and
    attaching the third part to the second part with a fastener that passes through the center bores of the first, second and third parts.

17. An adjustable bushing comprising:
    a first part having a first threaded section; and
    a second part having a second threaded section, the second threaded section mating with the first threaded section to couple the first and second parts together and permit an overall height of the bushing to be adjusted by rotating one of the first and second parts relative to the other of the first and second parts;
    wherein at least one of the first and second parts includes a side opening that is formed generally perpendicular to a center vertical axis of the respective part, the side opening being open along an outer surface of the respective part;
    wherein each of the first and second parts has a center bore that passes completely through each of the first and second parts from a top end to an opposing bottom end, wherein when the first and second parts mate together, the center bores are axially aligned.

18. The adjustable bushing of claim 17, further including a third part that is configured to mate with the second part, the third part having a center bore that passes completely through the third part from a top end to an opposing bottom end, wherein when the third part is mated with the second part, the center bore of the third part is axially aligned with the center bores of the first and second parts.

19. The adjustable bushing of claim 18, wherein the center bore defined in the third part is defined by at least two different diameters.

* * * * *